Feb. 3, 1959     J. N. COURCHESNE     2,871,906
WHEEL AND TIRE CONSTRUCTION
Filed June 9, 1955

Joseph N. Courchesne
INVENTOR.

BY *Clarence A. O'Brien*
*and Harvey B. Jackson*
Attorneys

# 2,871,906
WHEEL AND TIRE CONSTRUCTION
Joseph N. Courchesne, Flint, Mich.

Application June 9, 1955, Serial No. 514,211

2 Claims. (Cl. 152—418)

This invention relates to vehicle wheel construction, and more particularly to a pneumatic tire assembly for use in combination with the rim and axle of a wheel of a vehicle.

Pneumatic tires are subject to blow-outs due to rapid increases of pressure from heated portions of the tube caused by various reasons. It is therefore one of the primary objects of the present invention to provide means for safeguarding the vehicle from possible disastrous results occasioned by loss of pressure by supplying air into the tire at a suitable pressure to take place of the air lost from the tire.

The construction of this invention specially features a novel assembly of the hub cap and wheel whereby an air chamber is formed in communication with a bore in the axle which communicates with a special air reservoir for supplying air into the air chamber formed between the wheel and the hub cap and thence to the tire.

Still further objects and features of this invention reside in the provision of a novel wheel and tire construction that is highly efficient in operation, easy to install, and which is relatively inexpensive in cost, thereby permitting wide use and distribution.

These, together with the various ancillary objects and features of the invention which will become apparent as the following description proceeds, are attained by this novel wheel and tire construction, a preferred embodiment of which has been illustrated in the accompanying drawings, by way of example only, wherein.

Figure 2:
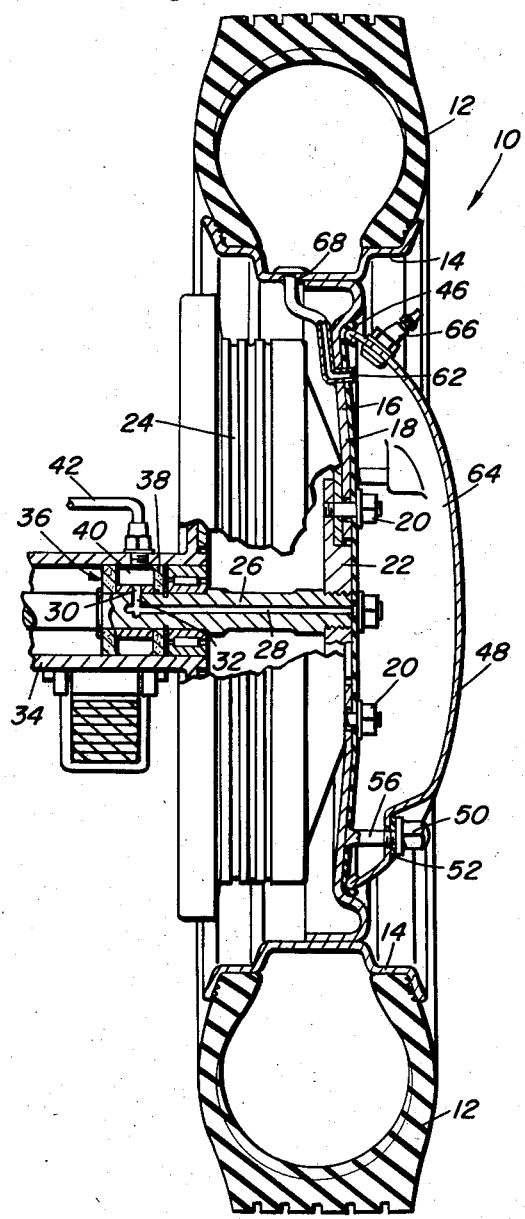
Figure 2 is an enlarged vertical sectional view as taken along the plane of line 2—2 in Figure 1.
Figure 1:
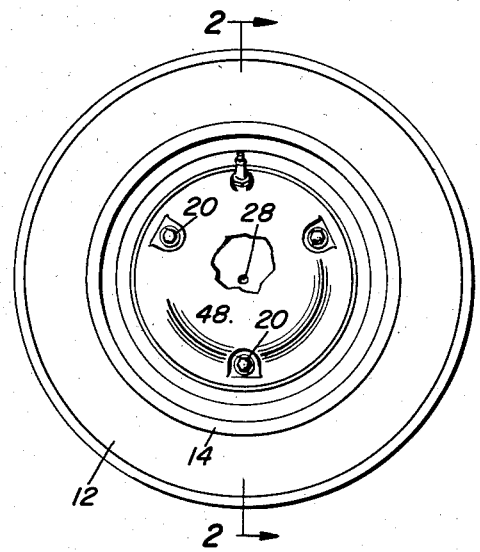
Figure 1 is a side elevational view of the wheel and tire construction comprising the present invention with a portion of the hub cap being broken away to show the bore in the axle.
Figure 3:
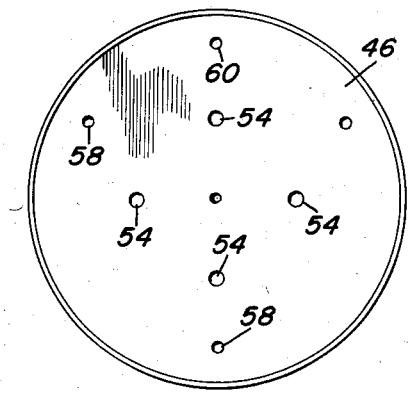
Figure 3 is an enlarged elevational view of a portion of the wheel.

With continuing reference to the accompanying drawings wherein like reference numerals designate similar parts throughout the various views, reference numeral 10 is used to generally designate the wheel and tire construction comprising the present invention. This wheel and tire construction includes a pneumatic tire 12 which is adapted to be supported on the rim 14 of the wheel 16 which has a mounting disk 18 adapted to be secured by bolts 20 to the flanged mounting plate 22 of the brake drum 24 which is mounted on the axle 26 in the conventional manner. The axle 26 is provided with a bore 28 which extends through a portion thereof and has a groove 40 extending about the periphery thereof which communicates through passage 32 with the bore 28. The groove 40 is defined by a casing 34 of the axle in conjunction with seals 36 and 38 and a sleeve 30. Connected to the groove through the casing 34 is a conduit 42 which is connectable to an air reservoir, not shown, mounted in any suitable portion of the vehicle.

Positioned on the wheel 16 is a gasket 46 which seals the wheel rim and securing the hub cap 48 to the wheel 16 are suitable fasteners 50 which cooperate with gaskets 52 to provide the air-tight relationship. It is noted that the gasket 46 is provided with suitable spaced apertures 54 for reception of the bolts 20 while the fasteners 50 are secured on studs 56 which extend from the wheel disk 18 through apertures 58 and through the suitable apertures provided therefor in the hub cap 48. In addition, an aperture 60 is provided in the disk for reception of a tube 62 which extends therethrough into the air chamber 64 formed by the hub cap 48 and the wheel disk 18, the tube 62 also extending through an aperture 68 in the rim 14 of the wheel so as to be in communication with the interior of the tire 12.

The hub cap is provided with a conventional valve 66 for introducing air into the tire and into the air reservoir.

In use, the tire 12 is inflated through use of the valve 66. Should air escape from the tire 12, the air in the casing will tend to refill the tire 12, thus slowing the rate of deflation of the tire. As the air leaves the chamber 64, it is replenished through the bore 28 and the conduit 42 from the air reservoir which is located in any other suitable portion of the vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A pneumatic vehicle tire and disk wheel construction comprising a wheel having a plurality of studs projecting from the disk thereof, a tire mounted on the rim of said wheel, a gasket engaged against and covering said disk and through which said studs pass, a hub cap having apertures therein receiving said studs with the peripheral edge of the hub cap engaged against the gasket, means clamping said edge of the hub cap to the gasket in airtight relationship to form an air chamber, a valve in said hub cap for filling said air chamber, said disk and said rim having apertures therethrough, a tube extending through said apertures between said air chamber and said tire intercommunicating said air chamber with said tire, said wheel being mounted on an axle having a bore therethrough opening into said air chamber, a casing about said axle, a groove in said axle, a passageway connecting said bore and said groove, and means connecting said groove with an air reservoir.

2. In a wheel and tire construction, an axle having a mounting plate fixed to the outer end thereof, said mounting plate having a disk-like central portion presenting a flat outer surface and having a stepped peripheral flange extending therearound, a disk wheel mounted on said plate and mounted upon the flange thereon with outer surface of the disk being substantially coplanar with the outer surface of the central portion of the mounting plate, a plurality of studs fixed to and extending outwardly from said disk, a gasket engaged against and covering said disk and the outer face of said mounting plate, a tire mounted on the rim of said wheel, a hub cap having apertures therein receiving said studs with the peripheral edge of the hub cap engaged against the gasket, means clamping said edge of the hub cap to the gasket in air tight relationship to form an air chamber, a valve in said hub cap for filling said air chamber, said disk and said rim having apertures therethrough, a tube extending through said apertures between said air chamber and said tire intercommunicating said air chamber with said tire, said axle having a bore therethrough opening into said air chamber, a casing about said axle, a groove in said axle, a passageway connecting said bore and said groove, and means connecting said groove with an air reservoir.

References Cited in the file of this patent

UNITED STATES PATENTS

| | | |
|---|---|---|
| 839,626 | Nielsen | Dec. 25, 1906 |
| 1,904,073 | O'Connor et al. | Apr. 18, 1933 |
| 2,090,089 | Wiegand | Aug. 17, 1937 |
| 2,543,156 | Elias-Reyes | Feb. 27, 1951 |